June 23, 1970 TOSHIO OKUBO 3,517,219

SCANNING PULSE GENERATOR

Filed Dec. 19, 1967

INVENTOR
TOSHIO OKUBO

BY Hopgood & Calimafde
ATTORNEYS

United States Patent Office 3,517,219

Patented June 23, 1970

3,517,219

SCANNING PULSE GENERATOR

Toshio Okubo, Tokyo, Japan, assignor to Nippon Electric Company, Limited, Tokyo, Japan, a corporation of Japan Filed Dec. 19, 1967, Ser. No. 691,809

Claims priority, application Japan, Dec. 29, 1966, 42/962

Int. Cl. H03k *5/00*

U.S. Cl. 307—269 3 Claims

ABSTRACT OF THE DISCLOSURE

A scanning pulse generator composed almost exclusively of field effect transistors, each stage comprising a pulse width expansion circuit including first and second field effect transistor with a field effect transistor-amplifier coupled thereto.

BACKGROUND OF THE INVENTION

Recently, in the field of image pick-up and display technology, it has been attempted to substitute a number of plane-disposed silicon p-n junction photodiodes and garium-arsenide p-n junction luminescence diodes for the image orthicon tube of a pick-up device and the cathode-ray tube of a display device, respectively, by resorting to semiconductor thin film integrated circuit techniques. This is primarily with a view towards miniaturizing the apparatus as a whole and lowering its power consumption.

One of the hardest problems encountered in such a substitution is how to sequentially scan the photo-sensitive plane of the pick-up device and the luminescent plane of the display device. A proposed scanning method is the so-called cross-grid method. It comprises a number of photo-sensitive elements regularly arranged in a plane in rows and columns. Corresponding ones of the terminals of the photo-sensitive elements in each row are connected in common to form a row selection line, while corresponding ones of the terminals in each column are similarly connected to form a column selection line. The scanning pulse voltages have suitable timing relations with each other and their application to row and column selection lines so that the cross points between each row and column may be sequentially scanned. The same is true with regard to the image display device.

Suitable circuits for generating the scanning pulse include a ring counter, shift register and matrix gate widely used in the computer field. Any one of the above-mentioned circuits in order to generate one scanning pulse requires at least one flip-flop circuit composed of a number of constituents having different properties, such as transistors, diodes, resistors and capacitors. Inasmuch as at least three to five hundred row and column selection lines are necessary to obtain sufficient resolution, the manufacture of the conventional scanning pulse generating means is very difficult even when resorting to integrated circuit techniques.

It is the object of this invention to obviate the foregoing disadvantages and provide a scanning pulse generator which is simpler to produce, smaller in size, and lower in power consumption than conventional devices of the same type.

SUMMARY OF THE INVENTION

This invention provides a scanning pulse generator comprising insulated gate type field-effect transistors (usually of the MOS type) which operate in the depletion mode in the normal state and assume the enhanced mode by inversion of bias voltage applied to the substrate electrode. The invention is based in principle on the virtual pulse width expansion obtained by degradation of the form of the trailing edge of a pulse. This degradation in wave form is attained by backward biasing the substrate electrode (of an insulated gate type field-effect transistor operating in the depletion mode) with respect to the source electrode, to convert the operation to the enhancement mode, because the conversion in the mode of operation results in a change in time constant defined by the source-drain capacitance and high resistance load of the transistor.

With the pulse generator of the invention, four components are sufficient for generating a scanning pulse, and the wiring is very simple. Therefore, a multi-stage scanning pulse generator is easily fabricated on a single semiconductor substrate using integrated circuit techniques. It follows therefore that a scanning pulse generator of small size, low power consumption and high reliability suitable for the solid state television pick-up devices and display devices is realized.

The above mentioned and other features and objects of this invention and the manner of attaining them will become more apparent and the invention itself will best be understood by reference to the following description of an embodiment of the invention taken in conjunction with the accompanying drawings, the description of which follows.

DESCRIPTION OF THE DRAWINGS

In FIG. 1*a*, the symbol Q designates an insulated-gate type field-effect transistor operating in the depletion mode and having gate G, drain D, source S, and substrate SS. The symbols $V_{GS}$, $V_{DS}$ and $V_B$ indicate the power supplies for supplying the gate and drain electrodes with operating voltages, and for backward biasing the substrate electrode with respect to the source electrode. FIG. 1*b* shows the variation in drain electrode current $I_D$ as a function of voltage $V_{GS}$, with voltage $V_{DS}$ maintained constant and with $V_B$ as a parameter. In FIG. 1*b*, the curve at $V_B=0$ shows the operating characteristics of the so-called depletion mode, wherein the current $I_D$ is caused to flow through transistor Q even if the gate voltage $V_{GS}$ is zero. However, as the absolute value of the bias voltage $V_B$ increases from $V_1$ to $V_2$, the curves move along the abscissa as shown in the drawing. Accordingly, the gate voltage $V_T$ at $I_D=0$ increases.

The operating mode of an insulated gate type field-effect transistor having curves such as the one at $V_B=0$ is called the enhancement mode. The fact that the voltage $V_T$ has a finite value facilitates the slicing operation of the logical circuit and prevention of its misoperation.

Figure 1A:
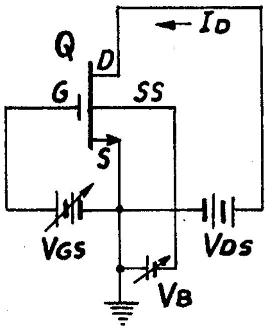
FIGS. 1*a* and 1*b* show a circuit diagram and characteristic curves, respectively, for explaining the characteristics of a field-effect transistor used in the invention.
Figure 1B:
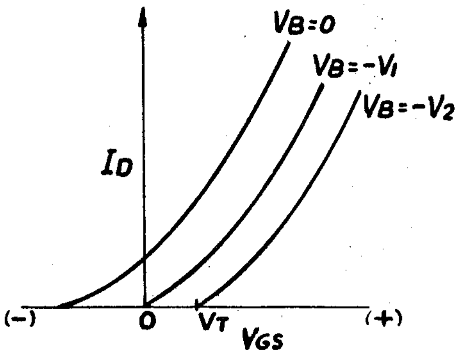
Figure 2:
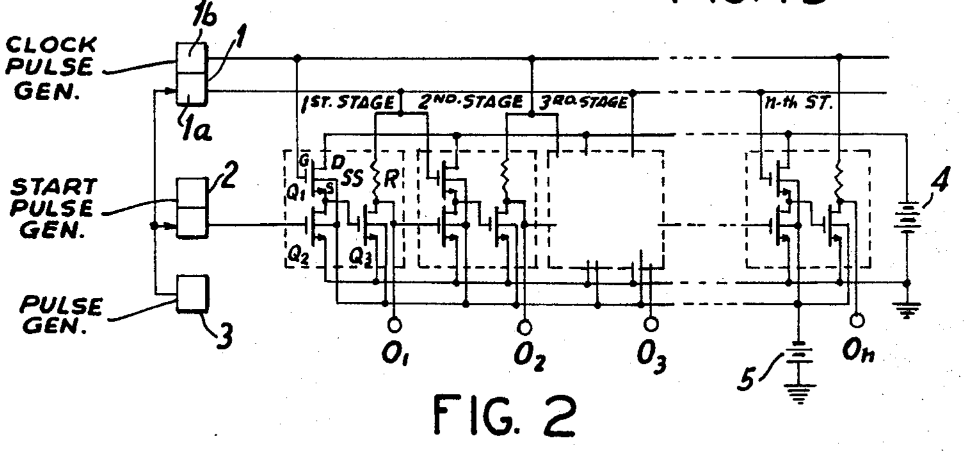
FIG. 2 is a circuit diagram of an embodiment of the invention.

Referring now to FIG. 2, the symbols $Q_1$, $Q_2$ and $Q_3$ designate insulated-gate type field-effect transistors (FET) in the depletion mode, which may be converted to the enhancement mode by backward biasing the substrate with respect to the ground potential by the voltage supplied from a direct-current power supply 5. The first and second FET $Q_1$ and $Q_2$ are serially connected to a direct-current power supply 4 so that the current flows in the same direction and they cooperatively constitute a pulse width expansion circuit. The third FET $Q_3$ constitutes a grounded-source amplifier to which a resistor R is connected as a load and the output from the drain of the FET $Q_2$ is supplied as the input. Similarly, the drain of the FET $Q_3$ of the third stage is directly connected to the gate of the corresponding FET $Q_2$ of the following adjacent stage. The same is repeated up to the $n$-th and final stage. The output terminals $O_1$ $O_2$ . . . and $O_n$ are attached to the drains of the third FET's $Q_3$ of each stage for deriving the scanning pulse output.

The reference numeral 1 designates a clock pulse generator comprising, for example, a free-running multivibrator for generating paired rectangular pulses having an arbitrary frequency and opposite polarities. For purposes of simplicity, it may be considered that clock pulse A of voltage E is generated from the box designated as 1*a* while a clock pulse B of the same voltage E but of opposite phase is generated from box 1*b*. Clock pulse A is applied to the drain of the third FET $Q_3$ of each odd-numbered stage for energizing the source-grounded amplifier of the succeeding stage. Also, the clock pulse A is applied to the gate of the first FET $Q_1$ of each of even-numbered stages for driving the pulse width expansion circuit of the succeeding stage. Similarly, the clock pulse B is applied to the drain of the third FET $Q_3$ of the grounded-source amplifier and to the gate of the first FET $Q_1$ of the pulse width expansion circuit of each of odd-numbered stages. A start pulse generator 2 is composed of, for example, a monostable multivibrator, the output of which is applied to the gate of the second FET $Q_2$ of the first stage. Multivibrators 1 and 2 are controlled by a synchronizing signal supplied from pulse generator 3.

Figure 3:
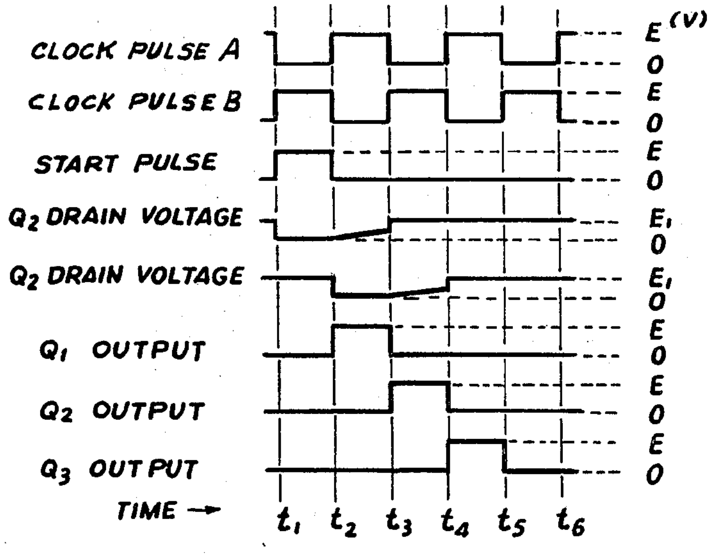
FIG. 3 is a group of the waveforms for explaining the operation of the embodiment of FIG. 2.

Upon applying a start pulse at time point $t_1$ to the gate of the second FET $Q_2$ of the first stage, FET $Q_2$ is turned conductive, changing the drain potential from $E_1$ to zero (see FIG. 3 in conjunction with FIG. 2). Next, although FET $Q_2$ is returned to nonconductive at time point $t_2$ in response to termination of the start pulse, the drain potential is not immediately restored to $E_1$. In this connection, it is assumed that the clock pulse B applied to $Q_1$ is restored to zero before the start pulse is restored to zero. No particular arrangement is necessary for attaining this time relation, because the trailing edge of the clock pulse B is unavoidably deformed. The reason for this is that the source-drain capacitance component of FET $Q_2$ is charged with the time constant defined by this capacitance and the equivalent source-drain resistance of FET $Q_1$, which is nonconductive at time point $t_2$.

In this manner, the mode of operation of the FET's is converted to the enhancement mode. In other words, inasmuch as the drain current, when operating in depletion mode, is existent even if the gate input voltage is zero, the equivalent source-drain resistance is low (several kiloohms), and consequently the time constant depending on the low equivalent resistance is small. In contrast, the source-drain capacitance and resistance in the enhancement mode reach about 2 picofarads and $10^{11}$ ohms, respectively, which makes the time constant as large as approximately 0.2 second.

Therefore, the drain potential of FET $Q_2$ is maintained approximately zero during a time interval longer than the period of the clock pulse used for scanning the image pickup device or display device. This results in the pulse width expansion with phase inversion of the start pulse. Although during time interval between time points $t_2$ and $t_3$ the clock pulse A is applied to the drain of the third FET $Q_3$ through the load resistor R, FET $Q_3$ remains nonconductive because its drain potential is returned to zero.

Thus, the scanning pulse output of the first stage is obtained at the output terminal $O_1$ as the clock pulse A causes FET $Q_3$ to produce a drain output. At time point $t_3$, the FET $Q_1$ becomes conductive, with the source and drain constituting almost a short circuit because the clock pulse B is applied to the gate of the first FET $Q_1$. Thus, the source-drain capacitance of FET $Q_2$ is quickly charged up, with the result that the drain potential of the FET $Q_2$ immediately recovers the potential $E_1$. After the time point $t_3$, the FET $Q_3$ remains conductive because the drain potential of the FET is kept at $E_1$ until the next input is applied. Consequently, the drain potential of the FET $Q_3$ is zero regardless of whether clock pulse A exists or not, with no scanning pulse output appearing at the output terminal $O_1$.

The scanning pulse output of the first stage serves as the start pulse of the second stage. The clock pulses A and B are applied to the constituent elements of the second stage in an inversely corresponding manner to the first stage. As a result of an operation similar to the first stage, the scanning pulse output of the second stage is obtained at the output terminal $O_2$. A similar operation is performed in each of the following stages, producing the scanning pulse outputs uniform in time at the output terminals $O_1$, $O_2$ . . . $O_n$.

While the principles of the invention have been described in connection with specific apparatus, it is to be clearly understood that this description is made only by way of example and not as a limitation to the scope of the invention as set forth in the objects thereof and in the accompanying claims.

For example, the load resistor R at each stage may be substituted by FET with the gate and drain being connected in common. In such a modification, the device of the invention is constructed only of FET's. Thus, by introducing such a modification, manufacture by masking diffusion is facilitated.

What is claimed is:

1. A scanning pulse generator for producing a successive train of pulses comprising:

a plurality of cascaded pulse generator stages each comprising: a pulse width expansion circuit including first and second depletion mode field-effect transistors connected in series, a grounded-source amplifier including a third depletion mode field-effect transistor coupled to said first and second transistors, and a resistive load element coupled to said amplifier; means for backward biasing the substrates of all said field-effect transistors of each said stages with respect to ground potential; means for applying a pair of clock pulses of opposite polarities to the gate of said first field-effect transistor of each stage and to said grounded-source amplifiers; means for applying a start pulse to the second field-effect transistor of the first one of said stages; and means for deriving the output of said grounded-source amplifier of each said stages.

2. The scanning pulse generator claimed in claim 1 wherein said amplifier is coupled to the junction of said serially connected transistors.

3. The scanning pulse generator claimed in claim 2 wherein said resistive load element comprises a field effect transistor.

References Cited

UNITED STATES PATENTS

| | | | |
|---|---|---|---|
| 3,322,974 | 5/1967 | Ahrons et al. | 307—304 XR |
| 3,382,455 | 5/1968 | Rapp | 307—279 XR |
| 3,383,570 | 5/1968 | Luscher | 307—279 XR |
| 3,421,092 | 1/1969 | Bower et al. | 307—279 XR |

STANLEY T. KRAWCZEWICZ, Primary Examiner

U.S. Cl. X.R.

307—223, 265